United States Patent [19]

Bonzer et al.

[11] Patent Number: 4,619,436

[45] Date of Patent: Oct. 28, 1986

[54] CONTROL REGULATOR HAVING A FABRIC REINFORCED DIAPHRAGM

[75] Inventors: William J. Bonzer; Gary L. Scott, both of Marshalltown, Iowa

[73] Assignee: Fisher Controls International, Inc., Marshalltown, Iowa

[21] Appl. No.: 765,489

[22] Filed: Aug. 14, 1985

[51] Int. Cl.$^4$ .......................................... F16K 31/145
[52] U.S. Cl. ...................... 251/61.1; 251/45; 251/331; 92/98 D; 92/103 F
[58] Field of Search .................. 251/61.1, 331, 45; 92/86, 98 D, 103 F

[56] References Cited

U.S. PATENT DOCUMENTS

| | | | |
|---|---|---|---|
| 2,501,957 | 3/1950 | Moore | 92/103 F X |
| 3,078,066 | 2/1963 | Moore | 251/61.1 |
| 3,451,423 | 6/1969 | Priese | 251/331 X |
| 3,623,700 | 11/1971 | Boteler | 251/331 |
| 3,982,558 | 9/1976 | Ochs | 137/505.18 X |
| 3,982,559 | 9/1976 | Ochs | 137/505.18 X |
| 4,295,631 | 10/1981 | Allen | 251/45 X |

Primary Examiner—Harold W. Weakley
Attorney, Agent, or Firm—Dale A. Kubly; Nicholas A. Camasto

[57] ABSTRACT

A rolling diaphragm regulator valve is affixed in a globe type valve body and includes a nonstretchable fabric reinforced elastomer diaphragm for covering and uncovering, by rolling action in response to changes in pressure in a control chamber, a plurality of apertures in a baffle positioned between the valve body inlet and outlet. An axially movable spring-biased nose piece, mounted behind the diaphragm, provides a surface over which the diaphragm is draped for controlling substantially all movement of the diaphragm. A travel indicator is operable by movement of the nose piece to provide a visual indication of the position of the valve. In one embodiment the baffle is notched adjacent to a peripheral mounting surface of the diaphragm, whereat the ends of the fabric reinforcement are exposed to permit entrained gases to escape. Other embodiments include areas of the diaphragm, exposed to the apertures, that have pinholes in the elastomer surface and that have the fabric surface exposed.

11 Claims, 7 Drawing Figures

U.S. Patent  Oct. 28, 1986  Sheet 2 of 3  4,619,436

CONTROL REGULATOR HAVING A FABRIC REINFORCED DIAPHRAGM

CROSS REFERENCE TO RELATED PATENT APPLICATION

This invention uses apparatus disclosed and claimed in U.S. application Ser. No. 694,176, filed Jan. 23, 1985 entitled Control Regulator Having A Rolling Diaphragm and assigned to Fisher Controls International, Inc., which application is hereby incorporated by reference herein.

FIELD OF THE INVENTION

This invention relates generally to flow control regulators or throttling valves and specifically to a valve or regulator incorporating a fabric reinforced elastomeric diaphragm.

BACKGROUND OF THE INVENTION

Control regulators or throttling valves of the type incorporating deformable elastomeric diaphragms or liners, that operate by pressure differentials on their two sides to variably uncover a plurality of orifices, e.g., slots, in a baffle positioned between an upstream inlet and a downstream outlet in a flowpath, are well known in the art. The operating pressure is referred to as a pilot pressure and is changeable to control the operating position of the diaphragm. Such valves may, for example, be used for controlling the flow of a variety of fluids and gases and, because of their regulating nature, are often operated in a partially open position with a substantial differential between the upstream and downstream pressures. While such valves have, in general, rendered satisfactory service, they are not without problems. In gas applications in particular, the flow velocity may create icing conditions on the diaphragm and give rise to problems in shut-off.

The flexible diaphragms are also subject to stretching. Under certain operating conditions the diaphragms may be "pinched" or folded over upon themselves, a condition which is detrimental to the life of the diaphragm and proper functioning of the valve.

The baffle generally comprises a frustroconical shaped grill containing slot-like apertures that are progressively covered and uncovered by the diaphragm as it is "rolled" inot and out of contact therewith. The portions of the slots that are uncovered by the diaphragm determine the flow rate through the baffle. Difficulties in some designs have resulted from uneven rolling of the diaphragm. A backup "nose piece" is often included to provide a stationary surface against which the diaphragm may rest to assist in controlling its movement during unrolling to minimize the above mentioned pinching and foldover. The slot configuration for the grill holes is very common, although circular or other shaped grill holes may also be used.

Another problem encountered with the rolling diaphragm is its tendency to be extruded into the slots of the frustroconical grill, by action of the operating pilot pressure against the diaphragm, when the valve is closed or partially closed. Another notable deficiency is the lack of any readily available means for indicating the amount that the valve is open for flow. Also, the valves are generally cylindrically shaped and designed to be clamped in a pipeline by suitable flanges and bolting, which has rendered servicing of the valve inconvenient in many installations.

The control regulator described and claimed in the referenced copending application provides a solution to the above mentioned difficulties in prior art devices. That control regulator includes a movable nose piece and a substantially nonstretchable diaphragm that, in a preferred embodiment, is fabric reinforced. The results obtained with the regulator have been very good at temperatures up to 120° F. and pressures up to 750 pounds per square inch (psi).

It has been found, however, that blistering of the diaphragm sometimes occurs when the control regulator is used in applications in a natural gas flowpath where the temperature of the gas reaches 150° F. at pressures of 750 psi. The blistering, generally found in the downstream side of the liner, is manifested by a separation of the downstream rubber or elastomer from the fabric and is believed to be due to entrained gas that permeates the rubber material of the diaphragm and forms pockets adjacent to the fabric reinforcement. The blistering seems to occur more readily at higher temperatures, probably as a result of the higher energy level of the gas molecules and the increased softness of the diaphragm. The present invention provides a solution to this problem by enabling release of entrained gases from the diaphragm.

OBJECTS OF THE INVENTION

A principal object of the invention is to provide a novel rolling diaphragm regulator valve.

Another object of the invention is to provide a rolling diaphragm regulator valve having improved service life.

A further object of the invention is to provide a rolling diaphragm regulator valve that is reliable in operation.

Still another object of the invention is to provide a rolling diaphragm regulator valve that minimizes blistering of the diaphragm.

SUMMARY OF THE INVENTION

In accordance with the invention, there is provided a rolling diaphragm regulator valve, for use in a gas environment, including a frustroconical baffle defining a plurality of apertures interposed between an upstream inlet and a downstream outlet, a substantially nonstretchable fabric reinforced elastomeric diaphragm arranged for rolling and unrolling to progressively cover and expose the apertures in response to pilot pressure in a control chamber and means for releasing any entrained gases in the diaphragm.

BRIEF DESCRIPTION OF THE DRAWINGS

These and other objects of the invention will be apparent upon reading the following description in conjunction with the drawings in which.

DESCRIPTION OF THE PREFERRED EMBODIMENT

Figure 1:
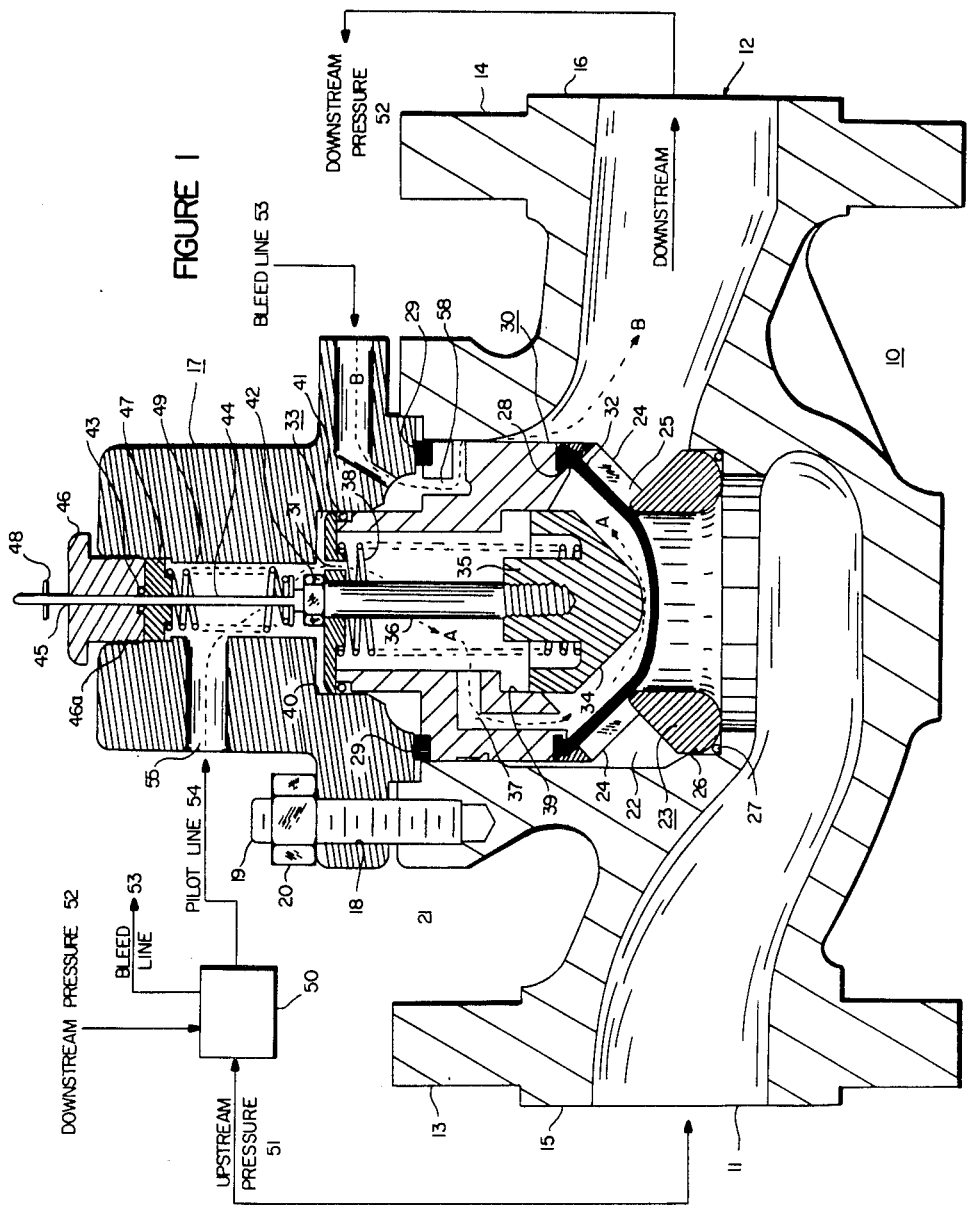
FIG. 1 is a cross section of a globe valve body incorporating a rolling diaphragm control regulator valve of the above mentioned copending application.

Referring to FIG. 1, which shows a valve constructed in accordance with the copending application, a valve body 10 of the globe type includes an upstream inlet 11, a downstream outlet 12 and a pair of mounting flanges 13 and 14. Flanges 13 and 14 include a plurality of mounting holes for supporting the valve body in a pipeline with mating surfaces 15 and 16 in sealing engagement with mating surfaces in corresponding pipeline flanges (not shown). The valve body has a bonnet 17 secured to the valve body by means of stud supports 21 which, as illustrated, may be simple threaded holes in the body. Bonnet 17 is oriented at right angles to the valve flow axis and, as will be seen, permits removal of the regulator valve for servicing without removal of the valve body from the pipeline.

Interposed between upstream inlet 11 and downstream outlet 12 is a baffle 23 including a frustroconical cage portion 24 defining a plurailty of slots or flow apertures 25 therein. The edges of the slots are preferably rounded and otherwise free of sharp surfaces to enhance the life of a contacting, generally frustroconically shaped, elastomeric diaphragm 32. The diaphragm, and the valve, in FIG. 1 are shown in the fully closed position with the slots 25 being fully covered by diaphragm 32 to prevent fluid flow from the upstream inlet to the downstream outlet of the valve.

The bottom portion of baffle 23 rests in a circular recess 26 in the valve body and is sealed to the valve body by compression of an O-ring 27 situated between the rounded bottom portion of baffle 23 and the bottom and side wall of recess 26. A generally cylindrically shaped retainer 30 is positioned above and in contact with the upper peripheral edge of the frustroconical cage portion 24 and includes an inwardly protruding recessed annular lip 28 for captivating and sealing the peripheral edge of diaphragm 32 therebetween, as illustrated. A gasket 29 is provided between a mating surface on the lower portion of bonnet 17 and a corresponding mating surface on the upper part of the valve body. When bonnet 17 is placed in position and nuts 20 tightened on studs 19, gasket 29, O-ring 27 and the peripheral edge of diaphragm 32 are compressed to provide respective fluid tight seals. In the same manner, the upper, smaller diameter portion of retainer 30 includes an annular groove in which an O-ring 41 is positioned for providing an edge seal with the cylindrical wall of a circular recess 40 in bonnet 17. The provision of the above mentioned seals assures that there is no communication between the upstream inlet and the downstream outlet except by means of the rolling diaphragm and baffle slots.

A movable cone-shaped nose piece 34 is moounted for axial movement in a deep circular recess 39 in retainer 30 in confronting relationship with diaphragm 32. It is affixed by any convenient means 35 to a shaft 36 and is spring loaded by a compression spring 38 for limited vertical axial movement with respect to retainer 30. Under the action of compression spring 38, nose piece 34 is urged downwardly toward the center of diaphragm 32. A head 42 on shaft 36 limits the downward movement of nose piece 34 by contacting the top of retainer 30 which has a circular hole through which shaft 36 passes. As shown, head 42, shaft 36 and retainer means 35 may simply take the form of a shoulder bolt threadingly engaging nose piece 34. An orifice 31 in the top of retainer 30 enables pilot pressure from an inlet 55 to pass into a control chamber 33 in which the regulator valve is situated. The pilot pressure (indicated by a broken line arrow A) is communicated to the inner surface of diaphragm 32 through a passage 37 in retainer 30. Since the pilot pressure is greater than the downstream pressure, when the valve is closed, diaphragm 32 is generally subjectd to a pressure differential which may result in gases permeating the diaphragm material.

An indicator shaft 44 contacts the top of head 42 on shaft 36 and extends through a cap 46 secured to the top of bonnet 17 by means of a threaded connection 46a or by any other suitable mounting arrangement. Cap 46 has an axially directed aperture 45 through which indicator shaft 44 protrudes. An O-ring 43 in a circular recess in the bottom of cap 46 provides a sealing engagement between the aperture wall and indicator shaft. A backing piece 47 is interposed between the bottom of cap 46 and a light compression spring 49 to provide a bias for maintaining the lower end of indicator shaft 44 in contact with head 42. A travel indicator 48 is affixed to the top of indicator shaft 44 and provides an convenient mechanism for visually indicating the amount that the regulator valve is opened to flow. The travel indicator may be a simple stem, as shown, or may include a backup indicator plate, if desired.

A pilot control valve 50 is shown as a block in communication with an upstream pressure source 51, a downstream pressure line 52, a bleed line 53 and a pilot pressure line 54. By any conventional means (not illustrated) the upstream pressure in the flowpath is sampled and supplied to the pilot control valve 50 by means of pressure line 51, the downstream pressure in the flowpath is sampled and supplied to pilot valve 50 via downstream pressure line 52 and bleed pressure is supplied by bleed line 53 to a bleed inlet 56 which communicates with a bleed passage to the downstream outlet as indicated by a broken line arrow B. The pilot pressure line 54 is coupled to inlet 55 in bonnet 17 and, as illustrated by arrow A, communicates with control chamber 33 which opens to the interior of retainer 30 by means of orifice 31 and extends through a passageway 37 behind diaphragm 32 and in front of nose piece 34. As is well known, the pilot control pressure controls the rolling movement of diaphragm 32 and therefore its position against the slots 25 in frustroconical cage 24. As the pilot pressure is increased, the diaphragm is moved to cover a greater portion of each of the slots.

It will be appreciated that as the valve is partially opened a portion of diaphragm 32 is rolled back against nose piece 34 and exposes portions of slots 25. The diaphragm is moved to this position by a decrease in the pilot pressure in the face of upstream pressure on the other side of the diaphragm and forces nose piece 34 to move upwardly into retainer 30, causing shaft 36 to move indicator shaft 44 and travel indicator 48. Since nose piece 34 is contacted by the center of the diaphragm almost immediately after the pilot pressure is decreased, diaphragm movement is very closely controlled as it drapes over the surface of the nose piece and forces it to move. Thus there is no tendency of the diaphragm to fold over or become pinched. This is fully described in the copending application.

In the fully open position of the valve diaphragm 32 is draped over substantially the full frontal surface of movable nose piece 34 and the full areas of the slots 25 are exposed to enable full flow from the upstream inlet to the downstream outlet through the baffle 23. The "arc length" of generally frustroconically shaped diaphragm 32, that is, the distance over the surface of the diaphragm between diametrically opposed points on its peripheral lip, is equal to the distance between these points measured along the surface of retainer 30 and across nose piece 34. This dimensioning permits a strong fabric reinforced nonstretch elastomeric diaphragm to be used.

As mentioned, diaphragm 12 is fabric reinforced and consists preferably of woven polyester material with nitrile rubber on both sides. The fabric is embedded along the approximate center line of the nitrile rubber diaphragm. In practice the diaphragm is manufactured by draping a layer of nitrile elastomer over a mold; draping the fabric over the nitrile elastomer; draping another layer of nitrile over the fabric; closing the mold with an upper mating portion and subjecting the nitrile rubber and fabric "sandwich" to heat and pressure suitable to enable the elastomer to penetrate the weave of the fabric and form a unitary molded structure. The polyester material consists of filaments made into strands that are tightly woven. The gas permeability of the fabric is greater than that of the nitrile elastomer. Thus gases that permeate the inner nitrile layer, coupled with the "wicking" characteristic of the fabric, result in gas molecules moving along the filaments and forming pockets where the filaments make a strand. These minute gas pockets also move along the fabric until a weak spot is found where the pressure seems to cause a separation of the fabric from the nitrile, resulting in blistering of the diaphragm. The weak spot may be due to a variety for factors, including undispersed components in the nitrile elastomer, the knit line in the elastomer and lack of uniformity in nitrile thickness, all generally referred to as "inclusions."

In order to permit release of any entrained gases that have permeated the inner elastomer layer, means are provided which enables the gases to work their way along the fabric and out of the diaphragm. In the regulator of the copending application, the fabric in the diaphragm is confined by the peripheral edge of the frustroconical cage portion 24 and the mating cylindrically shaped retainer 30. Consequently any gases that permeate the nitrile material of the diaphragm may become trapped along the fabric as mentioned. Under increasing temperature and pressure the gases could cause a separation between the fabric and the adjacent diaphragm material, and eventually lead to blistering of the diaphragm. As will be seen, the present invention enables any entrained gases to move along the fabric and be released from the diaphragm at selected areas.

Figure 2:
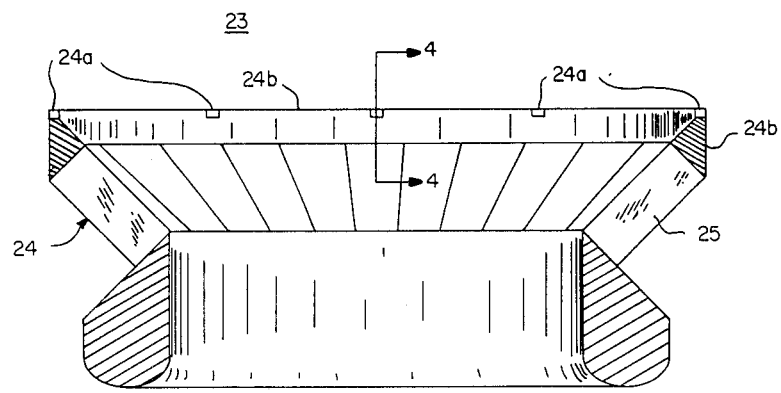
FIG. 2 is a cross section of the baffle of FIG. 1 showing the notched peripheral edge for relieving entrained gases.
Figure 3:
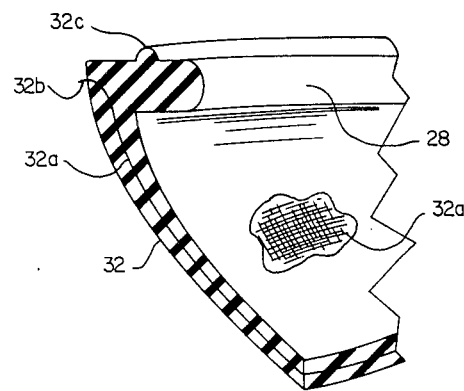
FIG. 3 is a partial perspective view of the fabric reinforced diaphragm with a portion of the inner nitrile surface removed to show the fabric.
Figure 4:
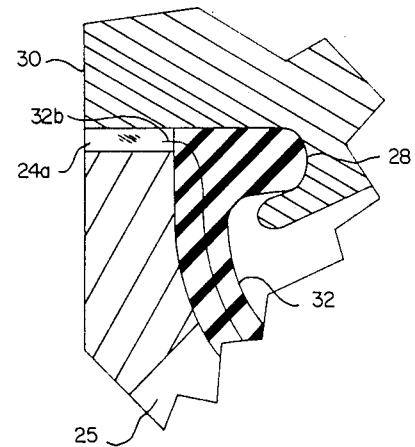
FIG. 4 is a partial sectional view of the baffle and diaphragm taken along line 4—4 of FIG. 2 through a notch in the baffle edge.

Reference to FIG. 2 shows a cross sectional view of one form of the invention wherein the frustroconical cage 24 of baffle 23 has a plurality of notches 24a formed in its peripheral edge 24b. Reference to FIGS. 3 and 4 discloses the construction of one form of diaphragm 32 which incudes a woven polyester fabric 32a, as described above, embedded such that substantially equal thicknesses of nitrile material are on each side of the fabric. The diaphragm may be molded with a top annular ridge 32c for assisting in compression of the diaphragm against the cage retainer 30 to prevent leakage between the diaphragm and the retainer. Notches 24a formed in edge 24b enable portions of the ends 32b of fabric 32a of the diaphragm to be exposed to downstream pressure and allows any entrained gases to work their way along the strands of fabric 32a and out of the diaphragm through fabric ends 32b. Thus blistering of the diaphragm is prevented.

Figure 5:
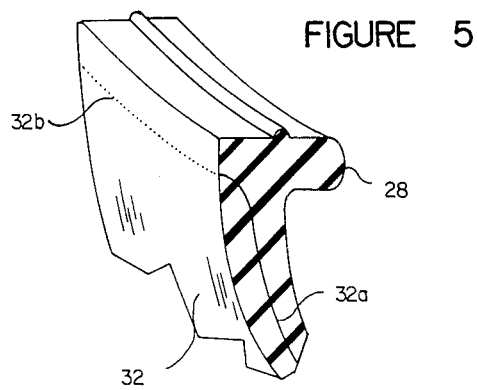
FIGS. 5, 6 and 7 are partial perspective views of three different diaphragm configurations in accordance with different aspects of the invention.

FIG. 5 clearly shows the ends 32b of fabric 32a in the diaphragm. Some of these ends are exposed, by virtue of the notches 24a formed in the peripheral edge 24b of the cage 24, to downstream pressure to allow release of entrained gases. The dimension and the number of notches are not critical. The notches should not be so wide as to permit extrusion of the diaphragm through them and there must of course be sufficient material at peripheral edge 24b to maintain structural integrity of the cage. As an example, a two inch (5.08 cm) diameter cage with eight notches, each approximately 0.10 inches (2.54 mm) long and 0.03 inches (7.62 mm) in depth, has proven satisfactory.

Figure 6:
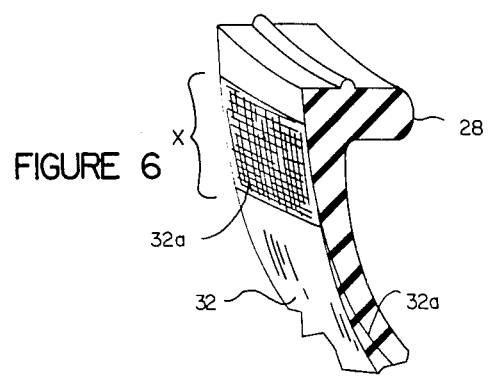

FIG. 6 illustrates another diaphragm configuration in which the surface of the fabric is permitted to be almost exposed near the upper portion of the diaphragm. Thus the surface of fabric 32a is partially visible in an area X about the periphery of the diaphragm. While this may be accomplished during molding of the diaphragm, the surface nitrile material may also be buffed or abraded from a diaphragm constructed in accordance with FIG. 3. The criterion is that the area of surface exposure of the fabric overlie the slot area of the cage to permit escape of entrained gases from the exposed surface of the woven fabric.

Figure 7:
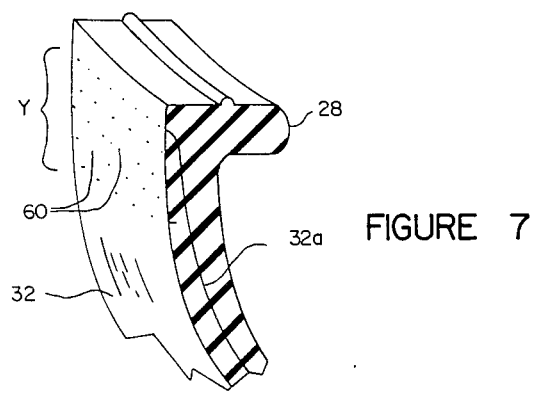

FIG. 7 illustrates yet another diaphragm construction having a series of minute pinholes around the periphery of the diaphragm in an area Y. As with the diaphragm of FIG. 6, the pinholes must be positioned to overlie the slots of the cage to permit entrained cases to be liberated downstream. This can readily be accomplished by locating the pinholes closer together than the distance between cage slots. Staggering the pinholes in successive rows as illustrated assures exposure to downstream pressure. The pinholes should extend no farther than the surface of the fabric.

The diaphragm and frustroconical cage constructions illustrated have been used in test pipelines containing natural gas at pressures of 750 psi and temperatures of 150° F. with no detrimental results. A valve constructed in accordance with the described aspects of the invention is thus capable of operation under extreme conditions and enables all of the advantages of the valve construction of the copending application to be extended to these conditions.

What has been described is a novel rolling diaphragm regulator valve that releases any entrained gases, thus preventing blistering and failure of the diaphragm. It is recognized that numerous modifications and changes in the described embodiments of the invention will be apparent to those skilled in the art without departing from its true spirit and scope. The invention is to be limited only as defined in the claims.

We claim:

1. In a rolling diaphragm regulator valve of the type including an upstream inlet, a downstream outlet, a frustroconical shaped baffle interposed between said inlet and said outlet defining a plurality of apertures and a frustroconical shaped elastomeric diaphragm arranged for rolling and unrolling, responsive to a pilot pressure in a control chamber, to progressively expose and cover the apertures to control upstream to downstream flow, the improvement comprising:
a fabric reinforcement in said diaphragm and means for exposing at least portions of said fabric to said downstream flow for enabling release of any entrained gases in said diaphragm.

2. The valve of claim 1 wherein said fabric reinforced elastomeric diaphragm is substantially nonstretchable.

3. The valve of claim 2 wherein said fabric reinforcement is exposed adjacent a mounting edge of said diaphragm; and
notch means in said baffle adjacent said mounting edge.

4. The valve of claim 3 wherein said diaphragm is composed of a woven polyester fabric embedded in a nitrile elastomer.

5. The valve of claim 2 wherein said diaphragm comprises a woven fabric surrounded by a nitrile elastomer and further including;
an area on the downstream side of said diaphragm where the surface of said woven fabric is substantially exposed.

6. The valve of claim 5 wherein said area consists of abraded nitrile elastomer.

7. The valve of claim 2 wherein said diaphragm comprises a woven fabric surrounded by a nitrile elastomer and wherein an area on the downstream side of said diaphragm includes a plurality of pinholes for enabling release of entrained gases along said fabric.

8. A rolling diaphragm regulator valve comprising:
a valve body defining a inlet and an outlet in axial alignment for mounting in a pipeline;
a baffle, interposed in said body between said inlet and said outlet, including a frustroconical portion defining a plurality of apertures;
a control chamber situated at right angles to said inlet and said outlet;
a diaphragm arranged for rolling and unrolling along the surface of said frustronconical portion, responsive to pressure in said control chamber, for progressively exposing and covering said apertures to regulate inlet to outlet flow, said diaphragm comprising a sandwich of a woven fabric reinforcement in a nitrile elastomer and being substantially nonstretchable;
an axially movable nose piece mounted in said control chamber behind said diaphragm;
spring means for urging said movable nose piece toward said diaphragm;
indicator means operable by movement of said nose piece for visually displaying an indication of the position of said valve; and
means exposing at least portions of said fabric to said flow for enabling release of any entrained gases in said diaphragm.

9. The valve of claim 8 wherein said frustroconical portion of said baffle includes an edge having a plurality of notches therein, and wherein said diaphragm includes an area secured to said baffle where the ends of said fabric are exposed to said notches for enabling release of said entrained gases.

10. The valve of claim 8 wherein said diaphragm includes a surface area, exposed to said apertures, where the surface of said fabric is exposed to said flow by being substantially devoid of said nitrile elastomer for enabling release of said entrained gases.

11. The valve of claim 8 wherein said diaphragm includes a surface area, exposed to said apertures, having a plurality of pinholes extending through to said fabric and exposing said fabric to said flow for enabling release of said entrained gases.

* * * * *